US012731352B2

(12) United States Patent
Ramesh et al.

(10) Patent No.: US 12,731,352 B2
(45) **Date of Patent: *Sep. 8, 2026**

(54) VIDEO SYSTEM WITH SCENE-BASED OBJECT INSERTION FEATURE

(71) Applicant: Roku, Inc., San Jose, CA (US)

(72) Inventors: Sunil Ramesh, Cupertino, CA (US); Michael Cutter, Golden, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,789

(22) Filed: Aug. 15, 2023

(65) Prior Publication Data

US 2024/0296641 A1 Sep. 5, 2024

Related U.S. Application Data

(63) Continuation of application No. 18/177,849, filed on Mar. 3, 2023, now Pat. No. 11,769,312.

(51) Int. Cl.
*G06T 19/20* (2011.01)
*G06T 15/10* (2011.01)
(Continued)

(52) U.S. Cl.
CPC .............. *G06T 19/20* (2013.01); *G06T 15/10* (2013.01); *G06T 15/503* (2013.01); *G06V 10/70* (2022.01);
(Continued)

(58) Field of Classification Search
CPC ....... G06T 19/20; G06T 15/10; G06T 15/503; G06T 2219/2016; G06V 10/70; G06V 20/41; G06V 2201/10; G06V 10/82
See application file for complete search history.

(56) References Cited

U.S. PATENT DOCUMENTS 7,230,653 B1 6/2007 Overton
10,839,416 B1 11/2020 Desmond
(Continued)

FOREIGN PATENT DOCUMENTS

WO WO 2020016353 A1 * 1/2020 ............. G06Q 30/02

OTHER PUBLICATIONS

Gibert, Xavier, Huiping Li, and David Doermann. "Sports video classification using HMMs." 2003 International Conference on Multimedia and Expo. ICME'03. Proceedings (Cat. No. 03TH8698). vol. 2. IEEE, 2003. (Year: 2003).*
(Continued)

*Primary Examiner* — Jin Ge
(74) *Attorney, Agent, or Firm* — McDonnell Boehnen Hulbert & Berghoff LLP

(57) ABSTRACT

In one aspect, an example method includes (i) obtaining video that depicts an area across multiple frames of the video, wherein the area is part of a scene of the video, and wherein the area is suitable for having an object inserted therein; (ii) detecting the area within the obtained video and determining area characteristic data associated with the detected area; (iii) determining scene attribute data associated with the scene; (iv) using at least the determined area characteristic data and the determined scene attribute data as a basis to select an object from among a set of multiple candidate objects; (v) inserting into the detected area the selected object to generate video that is a modified version of the obtained video; and (vi) outputting for presentation the generated video.

19 Claims, 7 Drawing Sheets

(51) Int. Cl.
*G06T 15/50* (2011.01)
*G06V 10/70* (2022.01)
*G06V 20/40* (2022.01)

(52) U.S. Cl.
CPC ...... *G06V 20/41* (2022.01); *G06T 2219/2016* (2013.01); *G06V 2201/10* (2022.01)

(56) References Cited

U.S. PATENT DOCUMENTS

| | | | |
|---|---|---|---|
| 2005/0001852 | A1 | 1/2005 | Dengler |
| 2006/0026628 | A1 | 2/2006 | Wan |
| 2016/0127778 | A1 | 5/2016 | Mishra |
| 2019/0182486 | A1 | 6/2019 | Arana |
| 2021/0334547 | A1* | 10/2021 | Cohen-Tidhar ........ G06V 10/82 |
| 2023/0052442 | A1 | 2/2023 | Zass |

OTHER PUBLICATIONS

Barron et al., "Shape, Albedo, and Illumination from a Single Image of an Unknown Object", Proceedings/CVPR, IEEE Computer Society conference on Computer Vision and Pattern Recognition, (Jun. 2012) http://www.researchgate.net/publication/228516983_Shape_Albedo_and_Illumination_from_a_Single_Image_of_an_Unknown_Object, retrieved Apr. 27, 2023*.

Great Learning Team, "Real-Time Object Detection Using TensorFlow", (Aug. 22, 2022) https://www.mygreatlearning.com;/blog/object-detection-using-tensorflow, retrieved Apr. 27, 2023*.

Guo et al., "Neural 3D Scene Reconstruction with the Manhattan-world Assumption", arXiv:2205.02836v2 [cs.CV] May 18, 2022*.

Mildenhall et al., "NeRF: Representing Scences as Neural Radiance Fields for View Synthesis", arXiv:2003.08934v2 [cs.CV] Aug. 3, 2020*.

Lopez-Moreno et al., "Multiple Light source Estimation in a Single Image", Computer Graphics Forum, (Aug. 20, 2013) https://onlinelibrary.wiley.com/doi/abs/10.1111/cgf.12195, retrieved Apr. 27, 2023*.

Elharrouss et al., "Image inpainting: A review" (Sep. 13, 2019)*.

Kán et al., "DeepLight: light source estimation for augmented realtiy using deep learning", The Visual Computer, 35:873-883 (May 7, 2019)*.

* cited by examiner

VIDEO SYSTEM WITH SCENE-BASED OBJECT INSERTION FEATURE

RELATED DISCLOSURE

This disclosure is a continuation of, and claims priority to, U.S. patent application Ser. No. 18/177,849 filed Mar. 3, 2023, which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) obtaining video that depicts an area across multiple frames of the video, wherein the area is part of a scene of the video, and wherein the area is suitable for having an object inserted therein; (ii) detecting the area within the obtained video and determining area characteristic data associated with the detected area; (iii) determining scene attribute data associated with the scene; (iv) using at least the determined area characteristic data and the determined scene attribute data as a basis to select an object from among a set of multiple candidate objects; (v) inserting into the detected area the selected object to generate video that is a modified version of the obtained video; and (vi) outputting for presentation the generated video.

In another aspect, an example computing system is disclosed. The computing system is configured for performing a set of acts that includes (i) obtaining video that depicts an area across multiple frames of the video, wherein the area is part of a scene of the video, and wherein the area is suitable for having an object inserted therein; (ii) detecting the area within the obtained video and determining area characteristic data associated with the detected area; (iii) determining scene attribute data associated with the scene; (iv) using at least the determined area characteristic data and the determined scene attribute data as a basis to select an object from among a set of multiple candidate objects; (v) inserting into the detected area the selected object to generate video that is a modified version of the obtained video; and (vi) outputting for presentation the generated video.

In another aspect, an example non-transitory computer-readable medium is disclosed. The computer-readable medium has stored thereon program instructions that upon execution by a computing system, cause performance of a set of acts that includes (i) obtaining video that depicts an area across multiple frames of the video, wherein the area is part of a scene of the video, and wherein the area is suitable for having an object inserted therein; (ii) detecting the area within the obtained video and determining area characteristic data associated with the detected area; (iii) determining scene attribute data associated with the scene; (iv) using at least the determined area characteristic data and the determined scene attribute data as a basis to select an object from among a set of multiple candidate objects; (v) inserting into the detected area the selected object to generate video that is a modified version of the obtained video; and (vi) outputting for presentation the generated video.

DETAILED DESCRIPTION

I. Overview

Video can be generated in various ways. For example, the video can be generated by using a camera and/or other equipment to capture or record a live-action event. In another example, video can be generated by rendering an animation to video. In yet another example, the video can be synthetically generated, such as by using one or more machine-learning based video generation techniques. Generated video can also be edited in various ways.

In connection with the process of generating and/or editing video, it can be desirable to insert an object into the video. Among other things, this can help allow a content creator to design, create, and/or edit a scene of the video-by adding one or more props or other objects into that scene. For example, consider a situation in which a content creator seeks to generate synthetic video that includes a scene that takes place in a Western-style saloon bar. In this case, the content creator may start with a scene that serves as a template and that includes some basic elements, such as a bar, a chandelier, and some bar stools, tables, and chairs. In this scenario, the content creator may then seek to add one or more objects to more fully build out the scene. For example, the content creator may seek to insert onto the table, an object (e.g., a shot glass or a liquor bottle) that is specifically tailored to that scene.

Disclosed herein are systems and methods that facilitate providing such functionality. In one aspect, this can involve a video system (i) obtaining video that depicts an area across multiple frames of the video, wherein the area is part of a scene of the video, and wherein the area is suitable for having an object inserted therein; (ii) detecting the area within the obtained video and determining area characteristic data associated with the detected area; (iii) determining scene attribute data associated with the scene; (iv) using at least the determined area characteristic data and the determined scene attribute data as a basis to select an object from among a set of multiple candidate objects; (v) inserting into the detected area the selected object to generate video that is a modified version of the obtained video; and (vi) outputting for presentation the generated video. These and related operations will now be described in greater detail.

II. Example Architecture

A. Video System

Figure 1:
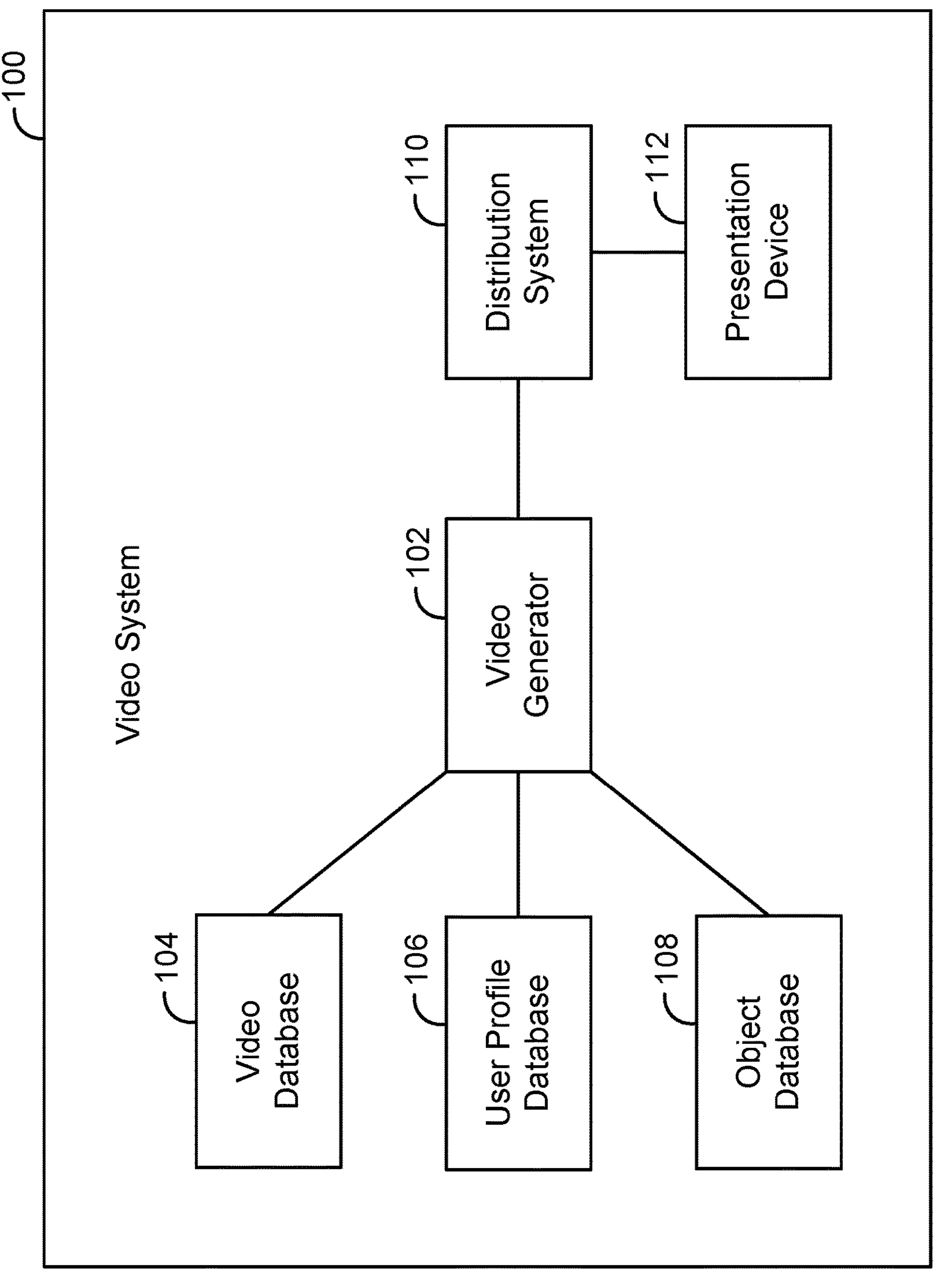
FIG. 1 is a simplified block diagram of an example video system in which various described principles can be implemented.

FIG. 1 is a simplified block diagram of an example video system 100. Generally, the video system 100 can perform operations related to video. There can be various types of video. For example, video can be or include a movie, a television show, or a commercial, or a portion or combination thereof, among numerous other possibilities.

Video can be made up of multiple frames and can be represented by video data, which can be generated, stored, and/or organized in various ways and according to various formats and/or protocols, using any related techniques now known or later discovered. For example, the video can be generated by using a camera and/or other equipment to capture or record a live-action event (perhaps with actors, props, etc.). In another example, the video can be synthetically generated (perhaps with synthetically generated actors, props, etc.), such as by using one or more of the techniques described in this disclosure, or by using any related video generation techniques now known or later discovered (e.g., by using one or more machine-learning based video generation techniques).

As noted above, video data can also be stored and/or organized in various ways. For example, video data can be stored and organized as a Multimedia Database Management System (MDMS) and/or in various digital file formats, such as the MPEG-4 format, among numerous other possibilities.

The video data can represent the video by specifying various properties of the video, such as luminance, brightness, and/or chrominance values, and/or derivatives thereof. In some instances, the video data can be used to generate the represented video. But in other instances, the video data can be a fingerprint or signature of the video, which represents the video and/or certain characteristics of the video and which can be used for various purposes (e.g., to identify the video or characteristics thereof), but which is not sufficient at least on its own to generate the represented video.

In some instances, video can include an audio component and/or metadata associated with the video and/or audio. In the case where the video includes an audio component, the audio is generally intended to be presented in sync together with the video. To help facilitate this, the video can include metadata that associates portions of the video with corresponding portions of the audio. For example, the metadata can associate a given frame or frames of video with a corresponding portion of audio. In some cases, audio can be organized into one or more different channels or tracks, each of which can be selectively turned on or off, or otherwise controlled.

In some instances, video (with or without an audio component) can be made up of one or more segments. For example, in the case where the video is a movie, the video may be made up of multiple segments, each representing a scene of the movie. As another example, in the case where the video is a television show, the video may be made up of multiple segments, each representing a different act of the show. In other examples, a video segment can be a smaller or larger portion of the video. For instance, a video segment can be a portion of one scene, or a portion of one act. Or a video segment can be multiple scenes or multiple acts, or portions thereof.

Returning back to the video system 100, as noted above, the video system 100 can perform operations related to video. For example, the video system 100 can perform operations related to object insertion within video. Such object insertion is sometimes referred to as overlay insertion. The video system 100 can include various components, such as a video generator 102, a video database 104, a user profile database 106, an object database 108, a distribution system 110, and a presentation device 112.

The video system 100 can also include one or more connection mechanisms that connect various components within the video system 100. For example, the video system 100 can include the connection mechanisms represented by lines connecting components of the video system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

In some instances, the video system 100 can include fewer or more components from that which has been described and/or the video system 100 can include multiple instances of at least some of the described components. The video system 100 and/or components thereof can take the form of a computing system, an example of which is described below.

B. Computing System

Figure 2:
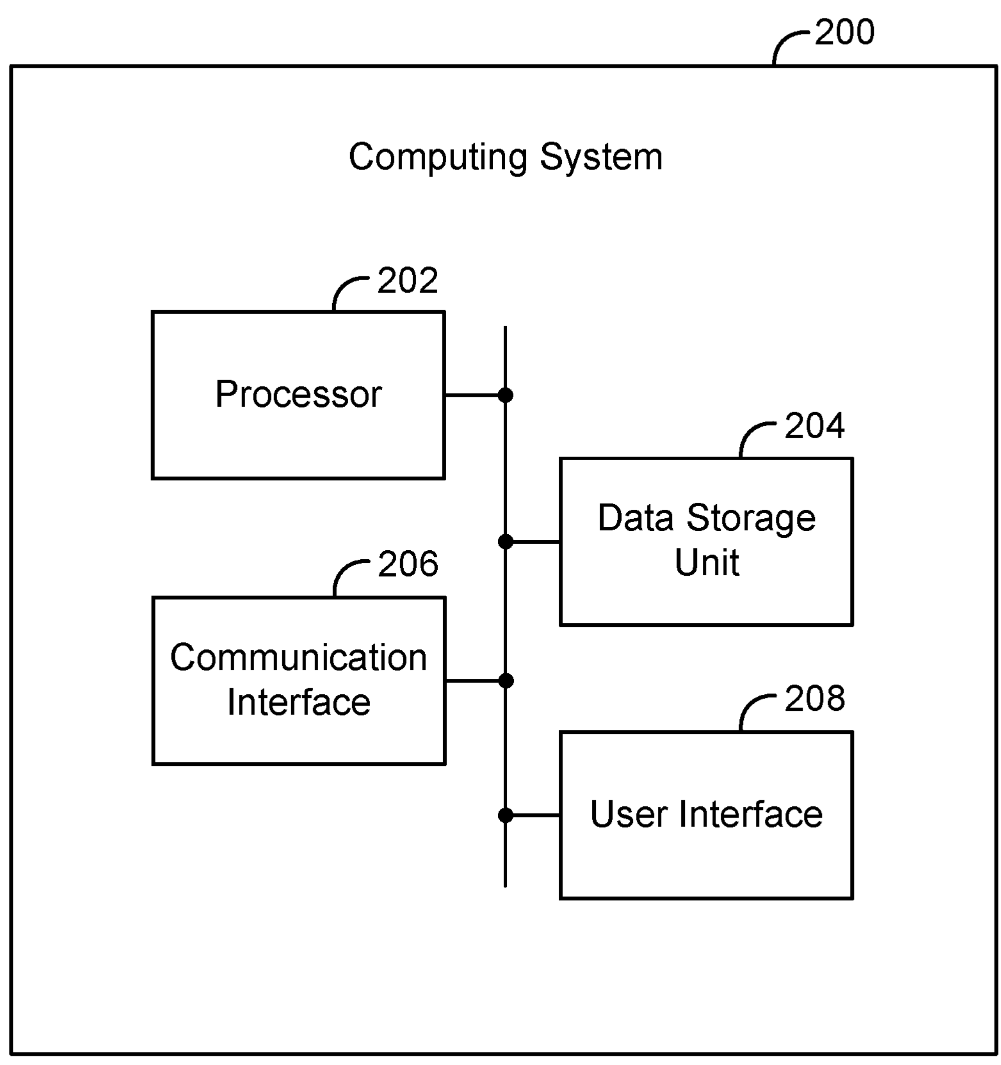
FIG. 2 is a simplified block diagram of an example computing system in which various described principles can be implemented.

FIG. 2 is a simplified block diagram of an example computing system 200. The computing system 200 can be configured to perform and/or can perform various operations, such as the operations described in this disclosure. The computing system 200 can include various components, such as a processor 202, a data storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data storage unit 204 as described below.

The data storage unit 204 can be or include one or more volatile, non-volatile, removable, and/or non-removable storage components, such as magnetic, optical, and/or flash storage, and/or can be integrated in whole or in part with the processor 202. Further, the data storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, such as a partially or fully cloud-based arrangement, for instance.

As noted above, the video system 100 and/or components of the video system 100 can take the form of a computing system, such as the computing system 200. In some cases, some or all of these entities can take the form of a more specific type of computing system, such as a desktop or workstation computer, a laptop, a tablet, a mobile phone, a television, a set-top box, a streaming media device, and/or a head-mountable display device (e.g., virtual-reality headset or an augmented-reality headset) among numerous other possibilities.

III. Example Operations

The video system 100, the computing system 200, and/or components of either can be configured to perform and/or can perform various operations. As noted above, the video system 100 can perform operations related to video. But the video system 100 can also perform other operations. Various example operations that the video system 100 can perform, and related features, will now be described with reference to select figures.

Among other things, the video system 100 can perform operations related to object insertion within video. In one aspect, this can involve the video system 100 (i) obtaining video that depicts an area across multiple frames of the video, wherein the area is part of a scene of the video, and wherein the area is suitable for having an object inserted therein; (ii) detecting the area within the obtained video and determining area characteristic data associated with the detected area; (iii) determining scene attribute data associated with the scene; (iv) using at least the determined area characteristic data and the determined scene attribute data as a basis to select an object from among a set of multiple candidate objects; (v) inserting into the detected area the selected object to generate video that is a modified version of the obtained video; and (vi) outputting for presentation the generated video. These and related operations will now be described in greater detail.

A. Obtaining Video that Depicts an Area

To begin, the video generator 102 can obtain video that depicts an area across multiple frames of the video, wherein the area is part of a scene of the video, and wherein the area is suitable for having an object inserted therein. As one illustrative example, the scene could be a scene of a "Western" movie, that is, a movie of the Western-style genre. As such, the scene could be a one that takes place within a Western-style saloon and that includes some related elements/objects (e.g., a bar, bar stools, tables, and chairs) that you might typically find in such a scene.

In one example, the video generator 102 can obtain video by selecting video based on input received from a user via a user interface, and then obtaining the selected video. In another example, the video generator 102 can do this by automatically selecting video based on one or more predefined rules, and then obtaining the selected video. The video generator 102 can then obtain the selected video in various ways, such as by retrieving from a video database such as the video database 104, video data representing the selected video.

As noted above, the video can depict an area across multiple frames of the video, wherein the area is part of a scene of the video, and wherein the area is suitable for having an object inserted therein. For example, continuing with the saloon scene example discussed above, the area can be a surface of a table in the saloon (depicted across multiple frames of the video). In some instances, the area may be limited to the portion of the surface where objects can be placed or otherwise inserted (e.g., specifically excluding portions of the surface that already include an object on the surface).

Figure 3:
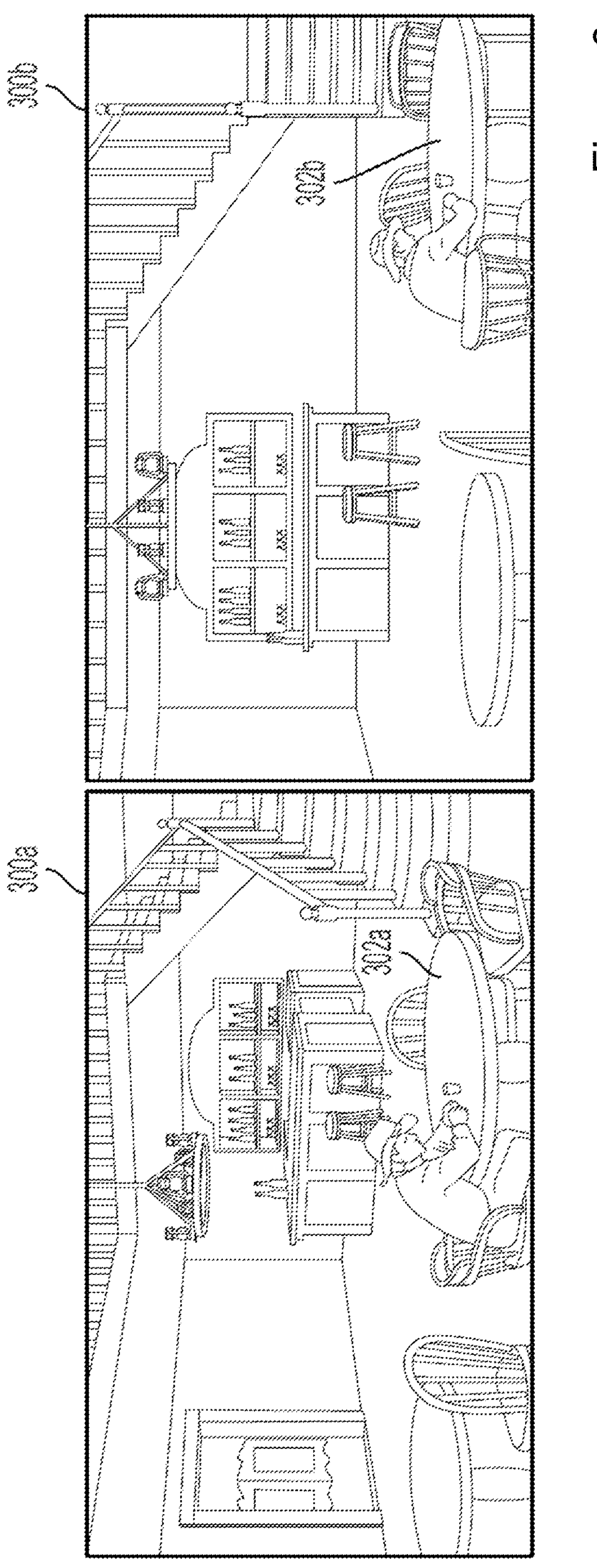
FIG. 3 is a depiction of frames of video content from a first example video.

FIG. 3 depicts an example of two frames of the video, namely a first frame 300*a* and a second frame 300*b*. For illustration purposes, it can be assumed that the second frame 300*b* comes a few seconds after the first frame 300*a*. Each frame depicts a table surface. However, due to movement of the camera from the first frame 300*a* to the second frame 300*b*, the depiction of the table surface changes at least slightly from the first frame 300*a* as compared to the second frame 300*b*. As shown, in the first frame 300*a*, the table surface is depicted in a first way (shown as the table surface 302*a*), whereas and in the second frame 300*b*, the table surface is depicted in a second way (shown as the table surface 302*b*).

B. Detecting the Area and Determining Area Characteristics Data

The video generator 102 can then detect the area within the obtained video and determine area characteristic data associated with the detected area.

There can be various types of area characteristic data. For example, the area characteristic data can indicate a size, shape, and/or orientation of the detected area. This data can be represented in various ways, such as with one or more sets of pixel coordinates that define area edges, boundaries, wireframe models, directional arrows, or the like, for one or more frames where the area is depicted. In this way, the area characteristic data can indicate a size, shape, and/or orientation of the detected area in a time-based manner, across the multiple frames of the video where the area is depicted.

Figure 4:
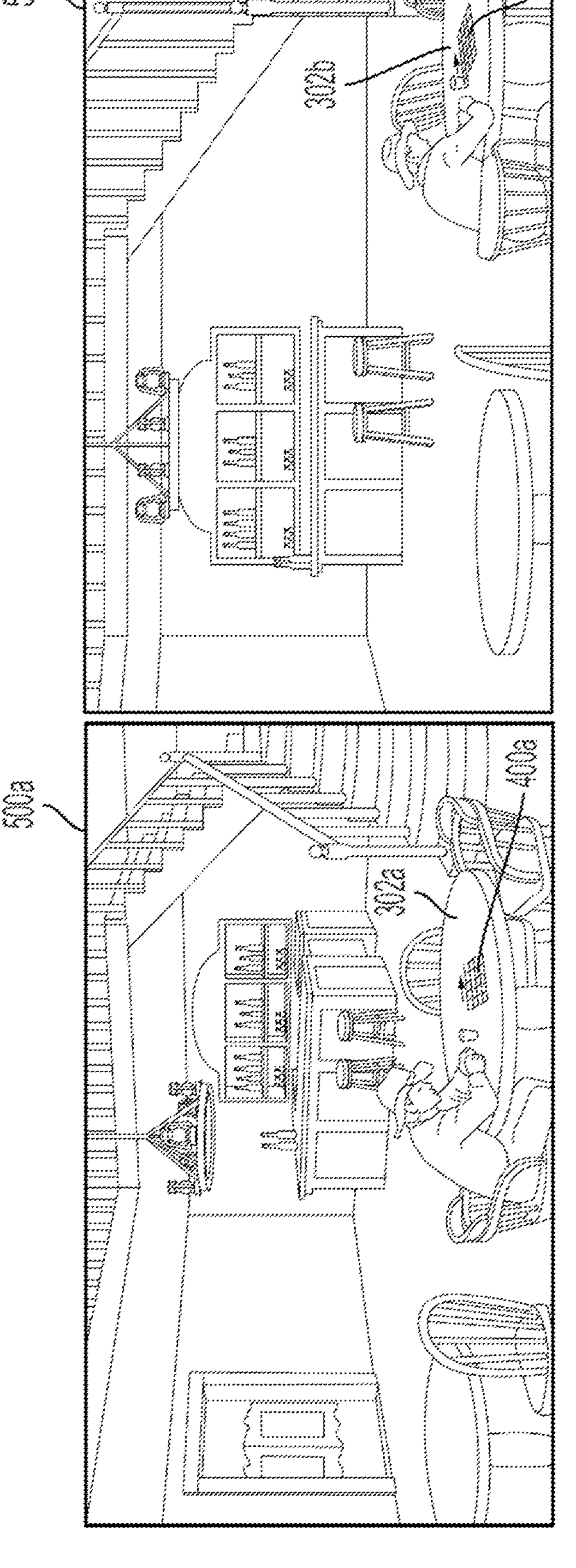
FIG. 4 is a depiction of the frames of video content of FIG. 3, with area characteristic data overlaid.

Returning to the example of the table surface in the saloon scene, the video generator 102 can detect the table surface and can determine area characteristic data for the table surface. FIG. 4 illustrates this and includes the same elements of FIG. 3, but with the addition of area characteristic data. As shown, with respect to the table surface 302*a* as shown in the first frame 300*a*, the area characteristic data 400*a* for the table surface 302*a* can be represented with a corresponding wireframe model and orientation indicator (e.g., in the form of an arrow that indicates a front of the area). Likewise, with respect to the table surface 302*b* as shown in the second frame 300*b*, the area characteristic data 400*b* for the table surface 302*b* can be represented with a corresponding wireframe model and orientation indicator.

In some instances, the video generator 102 detecting the area within the obtained video can involve determining area position data that indicates where within the frame the area is depicted and/or when (i.e., temporally within the video) the area is depicted. In some cases, this can relate to the area characteristic data, as there can be some overlap between these two types of data. For instance, in the case where the area characteristic data is a wireframe model indicating the edges of the detected area, the area position data can specify where within a frame the wireframe model is positioned, thereby indicating a position of the detected area within the frame. To indicate when temporally within the video the area is depicted, the video generator 102 can refer to appropriate starting and ending frames, time points, and/or time offsets, for instance.

It should be noted that although certain examples of area characteristic data have been described, there are merely for illustration purposes and various other types of data could also be used to indicate the characteristic and/or position of a detected area across multiple frames of the video.

The video generator 102 can detect the area within the obtained video and determine area characteristic data associated with the detected area in various ways. In one example, the video generator 102 can do so by employing a machine learning technique, such as one that uses a deep neural network (DNN) to train a model to use a runtime input-data set that includes video data, to generate a runtime output-data set that includes area characteristic data and/or area position data.

Notably though, before the video generator 102 uses a model to analyze a runtime input-data set to generate a runtime output-data set, the video generator 102 can first train the model by providing it with training input-data sets and training output-data sets. Each of the training input-data sets can include video data representing video depicting an area, and each of the training output-data sets can include area characteristic data and/or area position data of that area.

As such, in a first example set of training data, the training input-data can include video data representing video depicting a table surface, with the camera moving around the table to capture the table surface from different perspectives. And the training output data can include area characteristic data that is a time-based wireframe model and a time-based orientation indicator for the table surface. The training output data can also include area position data that is a time-based indication of the pixel coordinate corresponding to an anchor point of the wireframe model.

Additional and/or alternative training data sets (for the same or different types of video, areas, area characteristic data, area position data, etc.) can be used to train or further train the model. In practice, it is likely that large amounts of training data-perhaps thousands of training data sets or more-would be used to train the model as this generally helps improve the usefulness of the model.

Training data can be generated in various ways, including by being manually assembled. However, in some cases, the one or more tools or techniques, including any training data gathering or organization techniques now known or later discovered, can be used to help automate or at least partially automate the process of assembling training data and/or training the model.

In some examples, the video generator 102 can use one or more synthetic data generation techniques to generate synthetic data, which can be used as at least part of the training data. This can be done in various ways. For example, the video generator 102 can render synthetic data using computer graphic engines and/or libraries such as the Unreal engine and library provided by Epic Games, or the Unity engine and library provided by Unity Technologies, among numerous possibilities.

The synthetic data can take various forms. For example, the synthetic data can include video (or perhaps a given frame of video), where the video includes an area (e.g., a surface) suitable for having an object inserted therein and/or that includes an object. The synthetic video can also include metadata, such as metadata that specifies various properties of the video, area, and/or object. For example, the metadata can specify each pixel's three-dimensional location, semantic class, albedo or other light-related properties, or any other property that can be determined (e.g., based on information derived from the graphics engine). Notably, by varying various configuration parameters (e.g., types and locations of areas and objects in the scene, lighting sources, etc.), the video generator 102 can generate lots of difference instances of synthetic/training data covering many different examples of scenes with areas, objects, etc.

After the model is trained, the video generator 102 can then provide to the model runtime input data, which the model can use to generate runtime output data. Generally, the runtime input data is of the same type as the training input data as described above.

As such, in a first runtime example, the runtime video data (which could be different from the video data used to train the model) can include video data representing video that is a scene in a movie that depicts, among other things, a table with a table surface, such that the table surface is depicted across multiple frames of the video (as shown in FIG. 3). The model can then use this runtime input data to generate runtime output data, which can be of the same type as the output data as described above. As such, continuing with the first runtime example, the runtime output data can include area characteristic data and/or area position data for that table surface (as shown in FIG. 4).

Thus, more generally, responsive to the video generator 102 providing the video data to the trained model, the video generator 102 can receive from the trained model, corresponding generated area characteristic data and/or area position data. Examples of models that can be used for this purpose include any area/surface detection models and/or area/surface pose estimation models now known or later discovered.

It should be noted that in some cases, the specific types of training data and/or runtime data can include some or all of the different components described above, and perhaps other component as well. Also, the model, the training data, and the runtime data can be stored in and/or operate within, the video generator 102, for instance.

The video generator 102 can detect the area within the obtained video and determine area characteristic data associated with the detected area in other ways as well. For example, in some examples, this can involve the video generator 102 detecting the area and/or the area characteristic data by accessing related data identifying a placeholder area in the video, along with area characteristic data for that placeholder area. In practice, this might occur in a situation in which the video was synthetically created and where the video includes one or more placeholder areas that have been identified as areas where objects could potentially be inserted. This data could be stored as metadata for the video (perhaps embedded in the video itself, as one example). For instance, continuing with the saloon scene example, the video could include metadata that specifies an area (i.e., the table surface) where an object could potentially be inserted. The metadata could then further include corresponding area characteristic data.

C. Determining Scene Attribute Data

Next, the video generator 102 can determine scene attribute data associated with the scene of the video. There can be various types of scene attribute data. For example, the scene attribute data can include object description data for at least one object depicted in the scene. For example, continuing with the saloon scene example, the scene attribute data for the scene could include object description data for the bar, the chandelier, and for each of the bar stools, tables, and chairs in the scene. Object description data can include various types of information about an object within the scene. For example, object description data can specify a name, type, description, size, shape, material, style, and/or some other attribute/description of the object.

The video generator 102 can determine scene attribute data in various ways. For instance, in the case where the scene attribute data includes object description data, the video generator 102 determining scene attribute data can involve the video generator 102 providing video data representing the obtained video to a trained model, wherein the trained model is configured to use at least video data as runtime input-data to generate object description data as runtime output-data; and responsive to providing the video data to the trained model, receiving from the trained model, corresponding object description data. In this way, the video generator 102 can train a model that receives video data as input and that generates object description data as output. One example of a model that can be used for this purpose is the Object Detection model provided by TensorFlow. But other models can be used as well.

For example, in the context of the saloon scene example of FIG. 3, the video generator 102 can determine object description data that specifies information about the bar, the chandelier, or one or more of the stools, tables, or chairs in the scene, for instance. Such information can indicates various attributes or characteristics of those object, which individually or collectively may be specific enough information to identify such objects as ones being ones that are Western-themed and/or saloon-themed objects, for example.

In some instances, the object description data can be data for an object associated with the detected area. For example, continuing with the example of the saloon scene where the video generator 102 detects an area that is a surface of the table, the video generator 102 determining object description data can include the video generator 102 determining object description data for the table which has the detected surface.

Scene attribute data can take other forms as well. In another example, scene attribute data can include scene script data for the scene. Generally, a video script (sometimes called a screenplay) includes a written work that includes information relates to the setting, characters, dialog, stage direction, and related information for movies, television shows, or other types of videos. As such, scene script data can include this or other similar types of information. In some instances, scene script data can be metadata associated with the video, and can be stored in the video itself and/or in database accessible to the video generator 102.

As noted above, the video generator 102 can determine scene attribute data in various ways. For example, in the case where the scene attribute data includes scene script data, the video generator 102 determining scene attribute data can involve the video generator 102 extracting the scene script data from the video (e.g., stored as metadata embedded in the video) and/or obtaining it from a scene script database.

As an illustrative example, in the context of the saloon scene example of FIG. 3, the scene script data can provide information related to the setting, characters, dialog, stage direction, and related information of that scene. For instance, this scene script data may indicate that this is a scene which takes place in a Western-style saloon, and/or that the scene includes certain objects associated with a Western-style saloon, and/or actors wearing Western-style clothing, etc. As another example, the scene script data can specify dialog that may be of a Western-style type of dialog, for instance. In some cases, the scene script data can specify information that is associated with a given detected area. For example, continuing with the example of the saloon scene where the video generator 102 detects an area that is a surface of the table, the scene script data can specify information about the scene that is related to the table (e.g., the script can call for a person setting down a glass on the table, or a person picking up a bottle sitting on the table). As such, in this example, the video generator 102 determining scene script data can include the video generator 102 determining scene script data associated with the detected surface of the table.

Scene attribute data can take other forms as well. For example, scene attribute data can include scene scale data. Generally, scene scale data specifies information related to the scale of the scene, such as by specifying the depth of one or more pixels of one or more objects or other elements of the scene.

The video generator 102 can determine scene scale data in various ways. In some examples, this can involve the video generator 102 using any monocular depth estimation technique now known or later discovered, to determine a depth of one or more pixels of a given portion (e.g., an object or area) of the scene. In some cases, the video generator 102 can also leverage information about the given portion to help with this determination. For example, in the case where the portion of the scene is an object, the video generator 102 can leverage the corresponding object description data to help determine the depth of the object. Similarly, in the case where the portion of the scene is an area, the video generator 102 can leverage the corresponding object description data for a nearby object to help determine the depth of the area. Additionally or alternatively, in the case where the portion of the scene is an area, the video generator 102 can leverage the corresponding area characteristic data to help determine the depth of the area.

In some cases, object description data can indicate a size and/or shape of the object. The video generator 102 can then leverage this information as a basis to determine a scale of the object and/or other portions of the scene. For instance, in the case where a scene includes a speaker that is of a given brand and model, the video generator 102 can detect that the object is that specific brand and model of speaker (e.g., by accessing metadata of the video that specifies this or by using an object detection model to detect that specific brand and model based on the object's shape or other attributes) and can then use this information to look up size/scale information in a reference database, for example. The video generator 102 can then use that information as a reference point to determine the size and/or shape of other objects in the scene, to determine the scale of one or more objects in the scene and/or of the overall scene. In some instances, such as where a given object is known to be available in multiple sizes, the reference database can include size/scale information for each of those multiple sizes. And based on an analysis of multiple objects within the scene, the video generator 102 can determine which size/scale is most likely to be the correct one.

In some examples, the video generator 102 can use a trained model to help determine scene scale data. In this case, the video generator 102 can train the model by providing it with video data and corresponding metadata specifying information about areas and/or objects in the scene (e.g., metadata specifying a depth of each pixel of the object) as an input data set, such that the trained model can later be used to receive video data as input, and provide as output scene scale data that indicates a depth of the areas and/or objects (e.g., in the form of a depth of one or more pixels of the areas and/or objects).

D. Selecting an Object

Next, the video generator 102 can use at least the determined area characteristic data and the determined scene attribute data as a basis to select an object from among a set of multiple candidate objects. In this way, the video generator 102 can use information about the area of the scene where an object can potentially be inserted, together with information about the scene, to select an object that is suitable to be inserted into that area and that is specifically tailored for use in that scene, to facilitate that object then being inserted into the scene. For example, continuing with the saloon scene example, the video generator 102 can use area characteristics data for the table surface and scene attribute data that relates to the scene and perhaps more specifically to that table surface, to select an object to be inserted into the scene, and more specifically, on the surface of the table in that scene. For example, this might result in the video generator 102 selecting an object such as a shot glass or a liquor bottle, for insertion in the scene, specifically by being placed on the table. In a more specific example, based on the determined area characteristic data and/or the determined scene attribute data, the video generator 102 can select a more specific type of shot glass or a liquor bottle, namely one that adheres to the overall theme of the scene and/or that is appropriate in view of the scale of the detected area or of the scene generally, as one example.

As noted above, an object can have object description data that can specify various information, including information related to scale. For instance, the object description data could specify a range of acceptable sizes for the object, such that even if the object is scaled, its scaled size will remain within some predetermined range. In other examples, the object description data can provide an indication of the importance of an object's scale (e.g., by way of a score value within a given range). This can be useful in the context of inserting an object, as the video generator 102 can leverage this indication to selectively favor processing power and/or other resources in connection with inserting an object where scaling is deemed to be important. In this way, for certain objects (e.g., jewelry or other objects that may be positioned on a person's face) for which proper scaling may be especially important, this can be specified by way of that metadata such that more resources can potentially be devoted towards ensuring that the size of the object is properly scaled, for instance.

Candidate objects can be stored in an object database, such as the object database 108. A given object can be stored in the form of object data, which can include various data. For example, object data can include an object description data, such as an object identifier, an object name, object characteristic data (e.g., a size, shape, orientation, and/or scale of the detected object), and/or other information that represents the object (e.g., data in the form of a two-dimensional or three-dimensional model of the object).

Thus, in various examples, the video generator 102 can use at least the determined area characteristic data and the determined scene attribute data as a basis to select an object from among a set of multiple candidate objects, by using at least the determined area characteristic data and the determined scene attribute data to search for and select an object from among a set of multiple candidate objects that are stored in the object database 108. In one example, this process can involve the video generator 102 using mapping data to map at least the determined area characteristic data and/or the determined scene attribute data to an appropriate object from among a set of multiple candidate objects. This mapping data can be stored in the video generator 102 or the object database 108, for example.

For example, the mapping data could map area characteristic data for an area that is a surface of a table like the one from the example above, and scene attribute data for a saloon scene like the one described above, to an object that would be suitable for insertion in that area within that scene. For example, the mapping data could map to an object such as a shot glass or a liquor bottle, for example.

In practice, the mapping data could be much more detailed, such that more specific details of the area characteristic data and/or the scene attribute data, map to an object that is highly tailored for that specific area and/or scene. In practice, the mapping data could also include lots of mapping data sets (for the same or different types of area characteristic data, scene attribute data, object description data, etc.). In some cases, the mapping data may include other types of data as well. For example, the mapping data can include user profile data that can specify information such as user preference information, thereby allowing the video generator 102 to also consider user preference data when selecting an object.

In practice, it is likely that the mapping data will include large amounts of mapping data-perhaps thousands of mapping data sets or more. Mapping data can be generated in various ways, including by being manually assembled. However, in some cases, the one or more tools or techniques, including any data gathering or organization techniques now known or later discovered, can be used to help automate or at least partially automate the process of assembling mapping data.

Thus, more generally, with access to this mapping data, for given area characteristic data and scene attribute data (and potentially other data, such as user profile data), the video generator 102 can use the mapping data to map this data to a corresponding object. By selecting an object in this way, the video generator 102 can select an appropriate object to be inserted into the scene. Notably, in some instances, it may be desirable to apply a fuzzy logic algorithm or the like to help ensure that, even if the data being compared to the mapping data does not exactly match, the video generator 102 can detect near matches to allow the video generator 102 to still select an object that is suitable for the intended use as an object to be inserted.

E. Inserting the Object and Generating Video

Next, the video generator 102 can insert into the detected area the selected object to generate video that is a modified version of the obtained video. The video generator can do this in various ways.

In one example, this can involve the video generator 102 (*i*) obtaining a three-dimensional model of the selected object; (ii) using the obtained three-dimensional model of the selected object and the determined area characteristic data, together with a time-based affine (or other type of) transform model, to generate a time-based two-dimensional projection of the selected object; (iii) determining area position data associated with the detected area; and (iv) at a position indicated by the determined area position data, inserting the corresponding time-based two-dimensional projection of the selected object; and (v) applying a lighting estimation/normalization technique to blend the selected object into the video. In this way, the video generator 102 can carry out the object insertion in a generally seamless way, preferably eliminating or at least reducing the chance of the viewer noticing the object insertion. This example technique will now be described in further detail.

To begin, the video generator 102 can obtain a three-dimensional model of the selected object. In one example, this three-dimensional model can be stored in the object database 108 and as such, the video generator 102 can obtain the three-dimensional model by obtaining it from the object database 108. For example, in the context of the liquor bottle example described above, this could involve the video generator 102 obtaining a three-dimensional model of the liquor bottle.

In another example, such as where the object data for a given object represents the object in a limited number of views, one or more view synthesis techniques can be employed to create a three-dimensional representation suitable for object insertion. An example of such a technique is the Neural Radiance Fields or NeRF technique provided by Midenhall et al.

The video generator 102 can then use the obtained three-dimensional model and the determined area characteristic data, together with a time-based affine (or other type of) transform model, to generate a time-based two-dimensional projection of the selected object. In this way, the video generator 102 can create a two-dimensional projection of the selected object that corresponds to the detected area, on a frame-by-frame basis. In generating the time-based two-dimensional projection of the selected object, the video generator 102 can generate this according to an appropriate scale based on the corresponding scene scale data (as discussed above). In this way, the video generate 102 can insert into the scene, an object that is of the appropriate size. Thus, using the obtained three-dimensional model of the selected object and the determined area characteristic data, together with a time-based transform model, to generate a time-based two-dimensional projection of the selected object can involve using the obtained three-dimensional model of the selected object and the determined area characteristic data, together with a time-based transform model and scene scale data for the scene, to generate a scaled time-based two-dimensional projection of the selected object.

The video generator 102 can then determine area position data associated with the detected area, such as by using any of the techniques described above (e.g., by using a suitably trained model). Then, at a position indicated by the determined area position data, the video generator 102 can insert in the detected area the corresponding time-based two-dimensional projection of the selected object. Continuing with the liquor bottle example described above, this could involve the video generator 102 generating a time-based two-dimensional projection of the liquor bottle, where the bottom surface of the liquor bottle aligns with the surface of the table across multiple frames.

In this way, the video generator 102 can render the selected object in the detected area. In other words, with respect to the selected object, the video generator 102 can perform a three-dimensional transformation, such that the object is transformed into the scene's camera coordinate system. In some instances, this transformation can be derived by finding a known object (e.g., a planar object or a non-planar object) in the scene and solving the perspective-n-point problem to resolve the pose of this object. In this context, various techniques can be used to help reconstruct a scene, examples of which are described in "Neural 3D Scene Reconstruction with the Manhattan-world Assumption" by Guo et al.

In some instances, such as if the object is not planar, the video generator 102 can use monocular pose estimation to detect the area in which the object will be inserted into. Transformation through time can be tracked using various techniques such as sparse/dense optical flow-based techniques and/or other tracking techniques such as those that involve feature matching, template matching, deep-learning based matching, or the like. The video generator 102 can then apply one or more pose estimation techniques to determine the pose of the area and thus perform the object insertion operation.

After the insertion, the video generator 102 can then apply a lighting estimation/normalization technique to blend the selected object into the video. Continuing with the liquor bottle example described above, this can involve the video generator 102 applying such a technique to blend the liquor bottle into the video. Among other things, this can help eliminate or at least reduce the chance of the viewer noticing the object insertion.

In some instances, the video generator 102 applying the lighting estimation/normalization technique can involve first estimating a light source in the scene and/or estimating the albedo of the selected object. The video generator 102 can then consider these characteristics in connection with applying the lighting estimation/normalization technique, to help ensure a visually realistic insertion of the selected object. In connection with this process, the video generator 102 can apply any lightning estimation/normalization techniques now know or later discovered. Examples of such techniques include those described in "DeepLight: light source estimation for augmented reality using deep learning" by Kan et al., "Multiple light source estimation in a single image" by Jorge Lopez-Moreno et al., and "Shape, Albedo, and Illumination from a Single Image of an Unknown Object" by Jonathan Barron et al.

Figure 5:
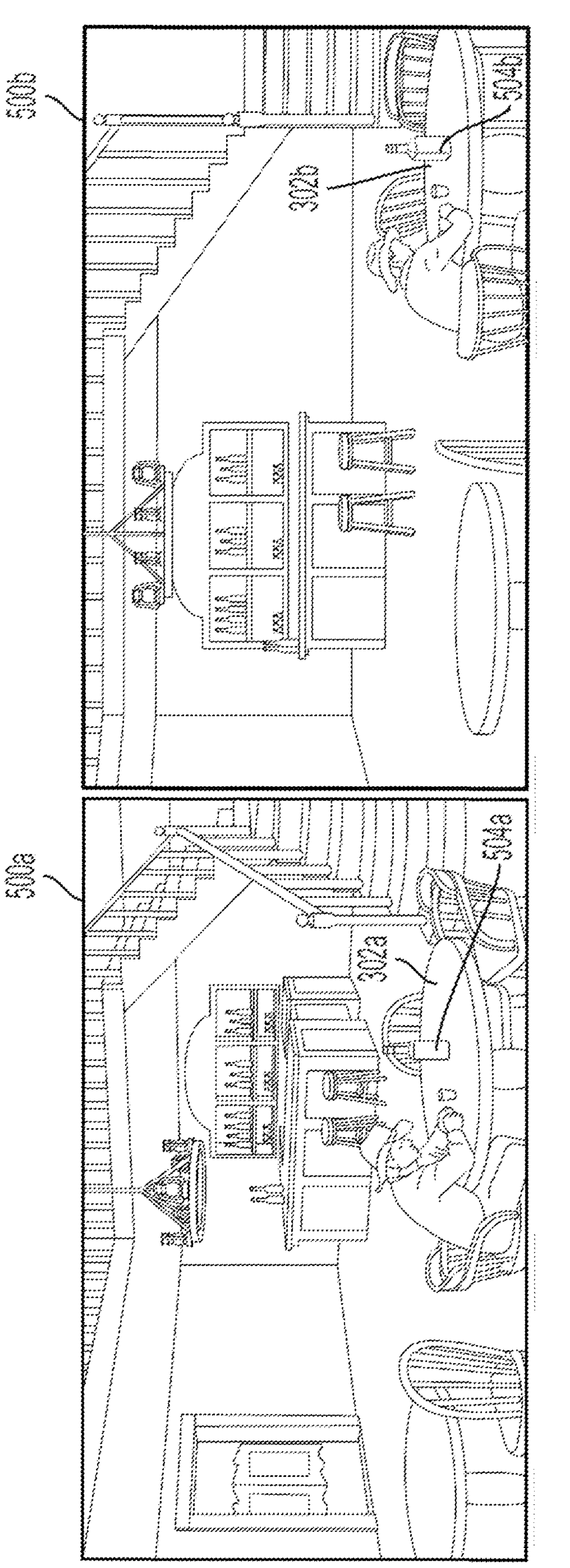
FIG. 5 is a depiction of the frames of video content of FIG. 3, after an object insertion operation.

FIG. 5 illustrates the result of the example insertion operation described above, in connection with the video referenced by FIGS. 3 and 4. In particular, as noted above, FIG. 5 depicts an example of two frames of the video, namely a first frame 500*a* and a second frame 500*b*, where in the video, the liquor bottle has been inserted. Notably, this insertion occurs across the frames, even as the depiction of the liquor bottle changes based on the changing camera position. As such, in the first frame 500*a*, the liquor bottle has been inserted in a first perspective (shown in FIG. 5 as the liquor bottle 504*a*). Likewise, in the second frame 500*b*, the liquor bottle has been inserted in a second perspective (shown in FIG. 5 as the liquor bottle 504*b*).

It should be noted that the video generator 102 can insert a selected object to generate video that is a modified version of obtained video in other ways as well, such as by using any object insertion and/or video generation technique now known or later discovered.

F. Outputting the Generated Video

After the video generator 102 generates the video (with the inserted object), the video system 100 can output the generated video for presentation. In one example, this can include the distribution system 110 transmitting the generated video to the presentation device 112, which can receive and itself output for presentation the generated video, such that it can be viewed by a user.

The distribution system 110 can transmit video on one or more channels (sometimes referred to as stations or feeds). As such, the distribution system 110 can be associated with a single channel content distributor or a multi-channel content distributor such as a multi-channel video program distributor (MVPD).

The distribution system 110 and its means of transmission of video on the channel to the presentation device 112 can take various forms. By way of example, the distribution system 110 can be or include a cable-television head-end that is associated with a cable-television provider and that transmits the video on the channel to the presentation device 112 through hybrid fiber/coaxial cable connections. As another example, the distribution system 110 can be or include a satellite-television head-end that is associated with a satellite-television provider and that transmits the video on the channel to the presentation device 112 through a satellite transmission. As yet another example, the distribution system 110 can be or include a television-broadcast station that is associated with a television-broadcast provider and that transmits the content on the channel through a terrestrial over-the-air interface to the presentation device 112. And as yet another example, the distribution system 110 can be an Internet-based distribution system that transmits the video using a video streaming-characteristic service or the like to the presentation device 112.

In these and other examples, the distribution system 110 can transmit the content in the form of an analog or digital broadcast stream representing the video.

The presentation device 112 can receive video from one or more entities, such as the distribution system 110. In one example, the presentation device 112 can select (e.g., by tuning to) a channel from among multiple available channels, perhaps based on input received via a user interface, such that the presentation device 112 can receive video on the selected channel.

In some examples, the distribution system 110 can transmit video to the presentation device 112, which the presentation device 112 can receive. The presentation device 112 can also output video for presentation. As noted above, the presentation device 112 can take various forms. In one example, in the case where the presentation device 112 is a television (perhaps with an integrated set-top box and/or streaming media device), outputting the video for presentation can involve the television outputting the video via a user interface (e.g., a display device and/or a sound speaker), such that it can be presented to an end-user. As another example, in the case where the presentation device 112 is a set-top box or a streaming media device, outputting the video for presentation can involve the set-top box or the streaming media stick outputting the video via a communication interface (e.g., an HDMI interface), such that it can be received by a television and in turn output by the television for presentation to an end-user.

As such, in various scenarios, the distribution system 110 can transmit video to the presentation device 112, which can receive and output the video for presentation to an end-user.

G. Editing System

In some instances, the video generator 102 can include an editing system component that allows a user to review, approve, reject, and/or edit various operations or results of operations (for example, as part of a quality assurance process). For instance, in the context of the video generator 102 determining area characteristic data of an area within a scene and/or scene attribute data of the scene, the editing system can playback the video with the determined area characteristic data and/or the determined scene attribute data overlaid on it or presented in connection with the it, and a user of the editing system can review and then approve or reject the area characteristic data and/or scene attribute data. Additionally or alternatively, a user can use the editing system to adjust the area characteristic data, such as by adjusting various aspects of the wireframe model or the direction of the orientation arrow, for instance.

Similarly, the editing system can provide an indication of the selected object and allow the user to confirm the selection or to select another object instead. In some examples, the editing system can present one or more objects to the user as potential selections (where the editing system selects ones that are deemed suitable for use in the scene, etc. using the techniques described above), and allow the user to select an object from among them, for purposes of then inserting the selected object into the scene. In this way, the editing system can help the video generator 102 act as a tool that helps a user generate and/or modify video.

H. Other Examples and Use Cases

Although the techniques described herein have been discussed in the context of a few illustrative examples, it should be understood that the techniques can be applied in the context of many other examples.

Indeed, the disclosed techniques can be used to insert a wide variety of different objects into video. For example, continuing with the saloon scene example described above, the described techniques could be used to facilitating inserting all kinds of different objects into the scene, such as any object that may commonly be found in such a scene. In some cases, the scene can be one that essentially serves as a skeleton for object insertion and that has a limited number of objects or perhaps no objects at all to start. In this case, the disclosed techniques can facilitate essentially creating a scene from scratch, starting with one object being inserted, and then another, and so on until the scene is complete. In other examples, a scene may be nearly complete, and the disclosure techniques may facilitate adding a final touch or otherwise tweaking the scene. Lots of other example use cases are possible as well.

For the sake of clarity, it should be noted that the saloon scene has been provided for illustration purposes only. Indeed, the disclosed techniques could be used in connection with lots of other types of scenes, of various types, with different themes, of different durations, etc. As another example, the scene could be one that takes place in an office and therefore certain office-themed objects (e.g., an office desk, computer, telephone, etc.) could be inserted into the scene. Of course, many other examples of scenes and objects are possible as well.

I. Example Methods

Figure 6:
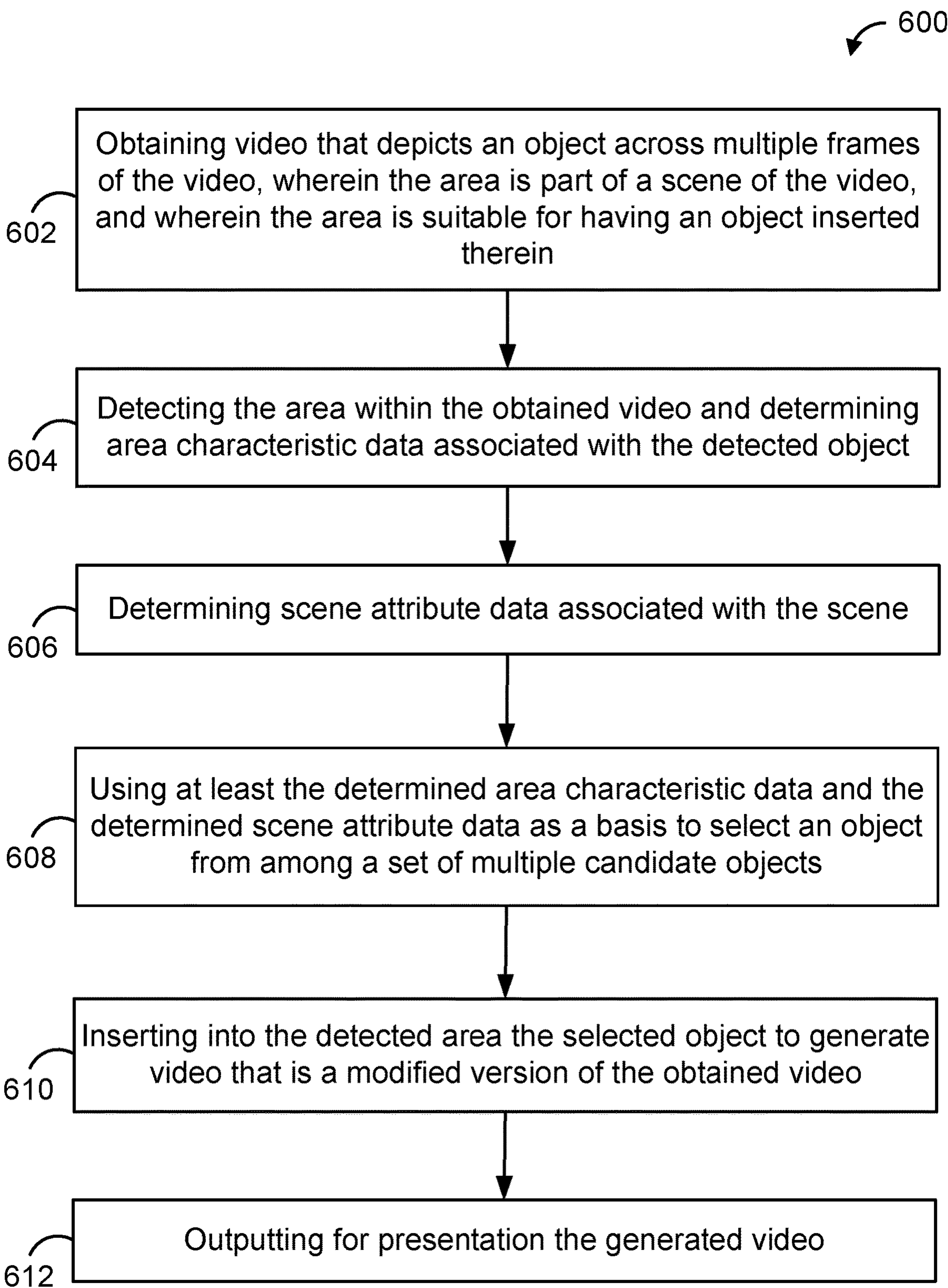
FIG. 6 is a flow chart of an example method.

FIG. 6 is a flow chart illustrating an example method 600. The method 600 can be carried out by a video system, such as the video system 100, or more generally, by a computing system, such as the computing system 200. At block 602, the method 600 includes obtaining video that depicts an area across multiple frames of the video, wherein the area is part of a scene of the video, and wherein the area is suitable for having an object inserted therein. At block 604, the method includes detecting the area within the obtained video and determining area characteristic data associated with the detected area. At block 606, the method includes determining scene attribute data associated with the scene. At block 608, the method includes using at least the determined area characteristic data and the determined scene attribute data as a basis to select an object from among a set of multiple candidate objects. At block 610, the method includes inserting into the detected area the selected object to generate video that is a modified version of the obtained video. At block 612, the method includes outputting for presentation the generated video.

Figure 7:
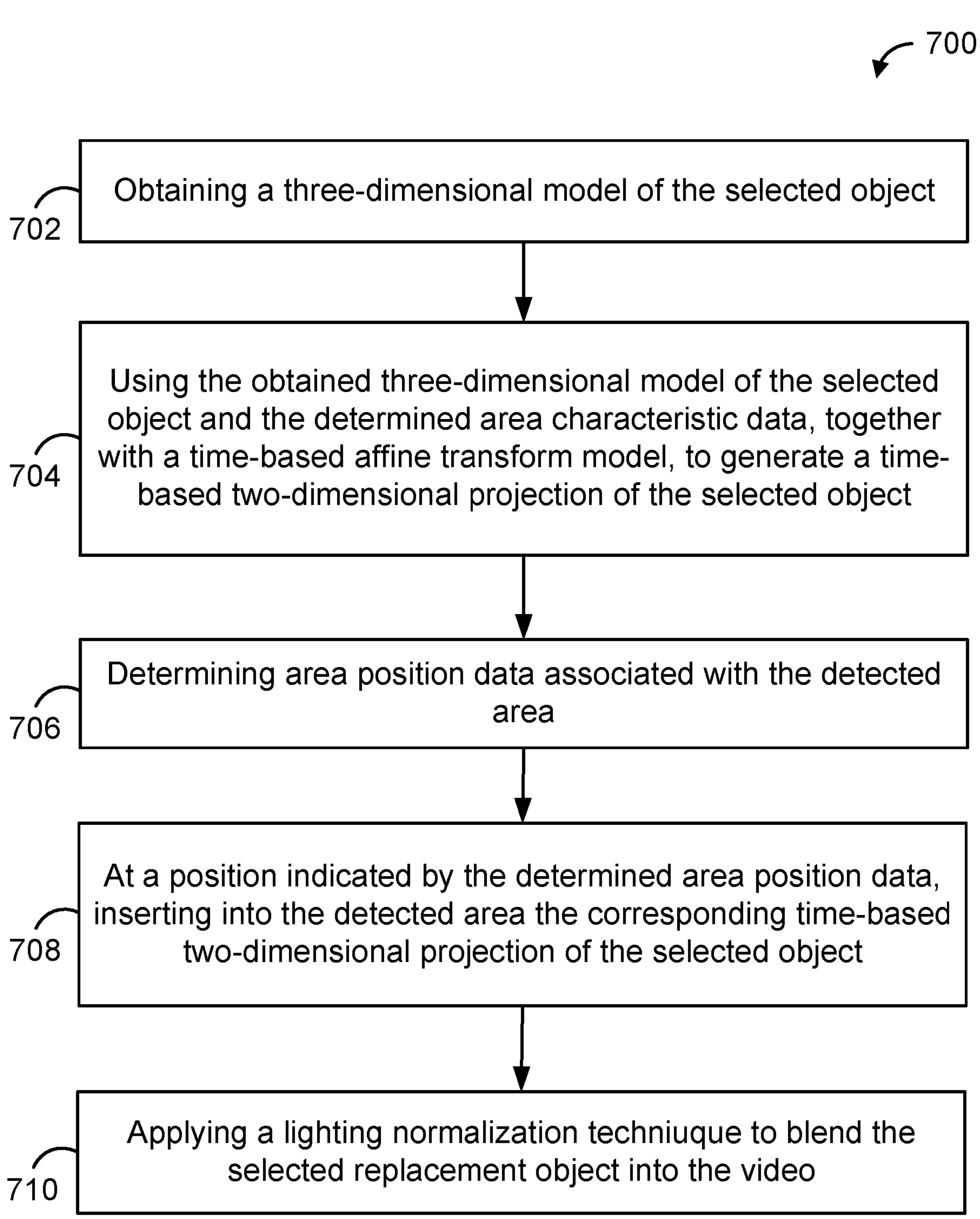
FIG. 7 is a flow chart of another example method.

FIG. 7 is a flow chart illustrating an example method 700. The method 700 can be carried out by a video system, such as the video system 100, or more generally, by a computing system, such as the computing system 200. At block 702, the method 700 includes obtaining a three-dimensional model of the selected object. At block 704, the method 700 includes using the obtained three-dimensional model of the selected object and the determined area characteristic data, together with a time-based affine transform model, to generate a time-based two-dimensional projection of the selected object. At block 706, the method 700 includes determining area position data associated with the detected area. At block 708, the method 700 includes at a position indicated by the determined area position data, inserting into the detected area the corresponding time-based two-dimensional projection of the selected object. At block 710, the method 700 includes applying a lighting normalization technique to blend the selected object into the video.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:

obtaining video depicting an area across multiple frames of the video, wherein the area is part of a scene of the video, and wherein the area is suitable for having an object inserted therein;

detecting the area within the obtained video and determining area characteristic data associated with the detected area;

determining scene attribute data associated with the scene, wherein determining scene attribute data associated with the scene comprises using video data representing the video to determine the scene attribute data;

using at least the determined area characteristic data and the determined scene attribute data as a basis to select an object to be inserted into the detected area, from among a set of multiple candidate objects;

obtaining description data associated with the selected object to be inserted into the detected area, wherein the obtained description data provides an indication of the importance of the object's scale;

inserting the selected object into the detected area to generate video that is a modified version of the obtained video, wherein inserting the selected object comprises: (i) obtaining a three-dimensional model of the selected object; (ii) scaling the three-dimensional model of the selected object and using the provided indication of the importance of the object's scale as a basis to select an extent of resources to utilize in connection with scaling the three-dimensional model of the object being inserted into the detected area; (iii) using the obtained three-dimensional model of the selected object and the determined area characteristic data, together with a time-based transform model, to generate a time-based two-dimensional projection of the selected object; (iv) determining area position data associated with the detected area; and (v) at a position indicated by the determined area position data, inserting into the detected area the corresponding time-based two-dimensional projection of the selected object; and outputting for presentation the generated video.

2. The method of claim 1, wherein the area is a surface of a floor within the scene.

3. The method of claim 1, wherein the area is a surface of an object within the scene.

4. The method of claim 1, wherein the area characteristic data indicates a size, shape or orientation of the detected area.

5. The method of claim 1, wherein detecting the area within the obtained video and determining the area characteristic data associated with the detected area comprises:

providing video data representing the obtained video to a trained model, wherein the trained model is configured to use at least video data as runtime input-data to generate area characteristic data as runtime output-data; and responsive to providing the video data to the trained model, receiving from the trained model, corresponding generated area characteristic data.

6. The method of claim 1, wherein the scene attribute data includes object description data for at least one object depicted in the scene, and wherein determining the scene attribute data comprises:

providing video data representing the obtained video to a trained model, wherein the trained model is configured to use at least video data as runtime input-data to generate object description data as runtime output-data; and responsive to providing the video data to the trained model, receiving from the trained model, corresponding object description data.

7. The method of claim 1, wherein the scene attribute data includes object description data for at least one object depicted in the scene, and wherein determining the scene attribute data comprises:

identifying object description data that is stored as metadata associated with the obtained video.

8. The method of claim 1, wherein the scene attribute data includes scene script data for the scene, and wherein determining the scene attribute data comprises:

identifying scene script data that is stored as metadata associated with the obtained video.

9. The method of claim 1, wherein using at least the determined area characteristic data and the determined scene attribute data as a basis to select an object from among a set of multiple candidate objects comprises using mapping data to map the determined area characteristic data and the determined scene attribute data to a corresponding object.

10. The method of claim 1, wherein using the obtained three-dimensional model of the selected object and the determined area characteristic data, together with a time-based transform model, to generate a time-based two-dimensional projection of the selected object comprises using the obtained three-dimensional model of the selected object and the determined area characteristic data, together with a time-based transform model and scene scale data, to generate a scaled time-based two-dimensional projection of the selected object.

11. The method of claim 1, wherein the indication of the importance of the object's scale is represented as a score value within a given range, where a low score in the range corresponds to a low use of resources in connection with scaling the object, and wherein a low score in the range corresponds to a low use of resources in connection with scaling the object.

12. The method of claim 1, wherein outputting for presentation, the generated video comprises a presentation device displaying the generated video.

13. The method of claim 12, wherein the presentation device is a television.

14. A computing system configured for performing a set of acts comprising:

obtaining video depicting an area across multiple frames of the video, wherein the area is part of a scene of the video, and wherein the area is suitable for having an object inserted therein;

detecting the area within the obtained video and determining area characteristic data associated with the detected area;

determining scene attribute data associated with the scene, wherein determining scene attribute data associated with the scene comprises using video data representing the video to determine the scene attribute data;

using at least the determined area characteristic data and the determined scene attribute data as a basis to select an object to be inserted into the detected area, from among a set of multiple candidate objects;

obtaining description data associated with the selected object to be inserted into the detected area, wherein the obtained description data provides an indication of the importance of the object's scale;

inserting the selected object into the detected area to generate video that is a modified version of the obtained video, wherein inserting the selected object comprises: (i) obtaining a three-dimensional model of the selected object; (ii) scaling the three-dimensional model of the selected object and using the provided indication of the importance of the object's scale as a basis to select an extent of resources to utilize in connection with scaling the three-dimensional model of the object being inserted into the detected area; (iii) using the obtained three-dimensional model of the selected object and the determined area characteristic data, together with a time-based transform model, to generate a time-based two-dimensional projection of the selected object; (iv) determining area position data associated with the detected area; and (v) at a position indicated by the determined area position data, inserting into the detected area the corresponding time-based two-dimensional projection of the selected object; and outputting for presentation the generated video.

15. The computing system of claim 14, wherein the scene attribute data includes object description data for at least one object depicted in the scene, and wherein determining the scene attribute data comprises:

providing video data representing the obtained video to a trained model, wherein the trained model is configured to use at least video data as runtime input-data to generate object description data as runtime output-data; and responsive to providing the video data to the trained model, receiving from the trained model, corresponding object description data.

16. The computing system of claim 14, wherein the scene attribute data includes object description data for at least one object depicted in the scene, and wherein determining the scene attribute data comprises:

identifying object description data that is stored as metadata associated with the obtained video.

17. The computing system of claim 14, wherein the scene attribute data includes scene script data for the scene, and wherein determining the scene attribute data comprises:

identifying scene script data that is stored as metadata associated with the obtained video.

18. A non-transitory computer-readable medium having stored thereon program instructions that upon execution by a computing system, cause performance of a set of acts comprising:

obtaining video depicting an area across multiple frames of the video, wherein the area is part of a scene of the video, and wherein the area is suitable for having an object inserted therein;

detecting the area within the obtained video and determining area characteristic data associated with the detected area;

determining scene attribute data associated with the scene, wherein determining scene attribute data associated with the scene comprises using video data representing the video to determine the scene attribute data;

using at least the determined area characteristic data and the determined scene attribute data as a basis to select an object to be inserted into the detected area, from among a set of multiple candidate objects;

obtaining description data associated with the selected object to be inserted into the detected area, wherein the obtained description data provides an indication of the importance of the object's scale;

inserting the selected object into the detected area to generate video that is a modified version of the obtained video, wherein inserting the selected object comprises: (i) obtaining a three-dimensional model of the selected object; (ii) scaling the three-dimensional model of the selected object and using the provided indication of the importance of the object's scale as a basis to select an extent of resources to utilize in connection with scaling the three-dimensional model of the object being inserted into the detected area; (iii) using the obtained three-dimensional model of the selected object and the determined area characteristic data, together with a time-based transform model, to generate a time-based two-dimensional projection of the selected object; (iv) determining area position data associated with the detected area; and (v) at a position indicated by the determined area position data, inserting into the detected area the corresponding time-based two-dimensional projection of the selected object; and outputting for presentation the generated video.

19. The non-transitory computer-readable medium of claim 18, wherein the scene attribute data includes object description data for at least one object depicted in the scene, and wherein determining the scene attribute data comprises:

providing video data representing the obtained video to a trained model, wherein the trained model is configured to use at least video data as runtime input-data to generate object description data as runtime output-data; and responsive to providing the video data to the trained model, receiving from the trained model, corresponding object description data.

* * * * *